United States Patent
Hua et al.

(10) Patent No.: US 10,791,443 B2
(45) Date of Patent: Sep. 29, 2020

(54) SYSTEM AND METHOD FOR ENHANCED MESSAGING USING EXTERNAL IDENTIFIERS

(71) Applicant: Verizon Patent and Licensing Inc., Arlington, VA (US)

(72) Inventors: Suzann Hua, Walnut Creek, CA (US); Sudhakar Reddy Patil, Flower Mound, TX (US); Wing-Cheong V. Yeung, San Ramon, CA (US); Priscilla Lau, Fremont, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 26 days.

(21) Appl. No.: 15/448,679

(22) Filed: Mar. 3, 2017

(65) Prior Publication Data

US 2018/0255421 A1    Sep. 6, 2018

(51) Int. Cl.
| | |
|---|---|
| *H04W 4/70* | (2018.01) |
| *H04W 4/12* | (2009.01) |
| *H04W 4/14* | (2009.01) |
| *H04L 29/12* | (2006.01) |
| *H04W 8/26* | (2009.01) |
| *H04L 29/08* | (2006.01) |
| *H04W 8/10* | (2009.01) |

(52) U.S. Cl.
CPC .......... *H04W 4/70* (2018.02); *H04L 61/303* (2013.01); *H04W 4/12* (2013.01); *H04W 4/14* (2013.01); *H04W 8/26* (2013.01); *H04L 61/1588* (2013.01); *H04L 61/605* (2013.01); *H04L 61/6054* (2013.01); *H04L 67/12* (2013.01); *H04W 8/10* (2013.01)

(58) Field of Classification Search
CPC ......... H04L 29/12188; H04L 29/12594; H04L 61/1588; H04L 61/308
See application file for complete search history.

(56) References Cited

U.S. PATENT DOCUMENTS

| | | | |
|---|---|---|---|
| 8,346,253 B2 * | 1/2013 | Shi ................... | H04L 29/12188 455/414.1 |
| 8,510,446 B1 * | 8/2013 | Pai ......................... | G06F 21/55 709/203 |
| 9,344,888 B2 * | 5/2016 | Starsinic ................. | H04W 4/70 |
| 9,451,421 B1 * | 9/2016 | Allen ..................... | H04M 15/57 |
| 10,129,689 B2 * | 11/2018 | Kathuria ............... | H04M 15/62 |
| 10,250,558 B2 * | 4/2019 | Starsinic ............... | H04W 4/027 |
| 10,360,563 B1 * | 7/2019 | Clubb .................. | G06Q 20/105 |
| 2008/0208715 A1 * | 8/2008 | Hod ...................... | G06Q 30/06 705/26.62 |
| 2009/0221310 A1 * | 9/2009 | Chen ..................... | H04L 51/066 455/466 |
| 2009/0253431 A1 * | 10/2009 | Shi .................... | H04L 29/12188 455/435.1 |

(Continued)

*Primary Examiner* — Parth Patel
*Assistant Examiner* — Bernhanu D Belete (57) ABSTRACT

A network device obtains an External Identifier for a user device. The External identifier includes a "<Local Identifier>@<Domain Identifier>" format. The network device generates a message, the message including a user identity field for the user device. The user identity field includes the External Identifier. The network device sends, to another network device, the message via an Sh interface.

20 Claims, 8 Drawing Sheets

(56) References Cited

U.S. PATENT DOCUMENTS

| | | | |
|---|---|---|---|
| 2012/0236871 A1* | 9/2012 | Wallace | H04L 61/605 370/401 |
| 2013/0016657 A1* | 1/2013 | Muhanna | H04W 80/04 370/328 |
| 2013/0279373 A1* | 10/2013 | Ding | H04M 15/63 370/259 |
| 2014/0016513 A1* | 1/2014 | Garcia Martin | H04L 51/38 370/259 |
| 2014/0341041 A1* | 11/2014 | Velev | H04Q 3/0045 370/236 |
| 2014/0342735 A1* | 11/2014 | Liao | H04W 60/06 455/435.1 |
| 2014/0351592 A1* | 11/2014 | Starsinic | H04W 4/70 713/168 |
| 2015/0163655 A1* | 6/2015 | Yang | H04W 4/70 370/328 |
| 2015/0195672 A1* | 7/2015 | Jain | H04W 4/70 455/466 |
| 2015/0264634 A1* | 9/2015 | Ding | H04W 48/14 455/434 |
| 2015/0341889 A1* | 11/2015 | Starsinic | H04W 4/70 370/329 |
| 2016/0007390 A1* | 1/2016 | Starsinic | H04W 76/11 370/328 |
| 2016/0100362 A1* | 4/2016 | Palanisamy | H04W 52/0212 370/311 |
| 2016/0135222 A1* | 5/2016 | Jain | H04W 36/14 370/329 |
| 2016/0359797 A1* | 12/2016 | Bhalla | H04L 61/106 |
| 2017/0019750 A1* | 1/2017 | Palanisamy | H04W 28/0289 |
| 2017/0099562 A1* | 4/2017 | Bhalla | H04L 67/16 |
| 2017/0126747 A1* | 5/2017 | Merino Vazquez | H04L 65/1016 |
| 2017/0134444 A1* | 5/2017 | Buckley | H04W 12/0608 |
| 2017/0150332 A1* | 5/2017 | Palanisamy | H04W 4/14 |
| 2017/0201871 A1* | 7/2017 | Ryu | H04W 4/70 |
| 2018/0041550 A1* | 2/2018 | Mufti | H04L 65/1006 |
| 2018/0049156 A1* | 2/2018 | Laha | H04W 76/28 |
| 2018/0192234 A1* | 7/2018 | Mohamed | H04W 4/02 |
| 2019/0045343 A1* | 2/2019 | Palanisamy | H04L 12/28 |
| 2019/0230492 A1* | 7/2019 | Suzuki | H04W 4/70 |
| 2019/0306753 A1* | 10/2019 | Uchida | H04W 28/14 |

* cited by examiner

| Information element name (410) | Mapping to Diameter AVP (420) | Cat. (430) | Description (440) |
|---|---|---|---|
| IMS Public User Identity / Public Service Identity (450) | Public-Identity | C | IMS Public User Identity or Public Service Identity for which data is required. If the MSISDN is not included in the User-Identity AVP, the Public-Identity AVP shall be included in Sh messages only for allowed Data References. |
| MSISDN (460) | MSISDN | C | MSISDN for which data is required. If the Public-Identity AVP is not included in the User-Identity AVP, the MSISDN AVP shall be included in the Sh-Pull or Sh-Subs-Notif or Sh-Update messages only for allowed Data References. |
| External Identifier (470) | External-Identifier | C | External ID with format of "<Local Identifier>@<Domain Identifier>" for which data is required. The usage and applicability of External ID for Sh interface should be same as MSISDN for the Sh interface. |

FIG. 4

```
< User-Data -Request> ::=  < Diameter Header: 306, REQ, PXY, 16777217 >
                           < Session-Id >
                           [ DRMP ]
                           { Vendor-Specific-Application-Id }
                           { Auth-Session-State }
                           { Origin-Host }
                           { Origin-Realm }
                           [ Destination-Host ]
                           { Destination-Realm }
                           *[ Supported-Features ]
                510 ─────▶ { User-Identity }
                           *[ Service-Indication ]
                520 ─────▶ *{ Data-Reference }
                           *[ Identity-Set ]
                           *[ AVP ]
                           *[ Proxy-Info ]
                           *[ Route-Record ]
```

SYSTEM AND METHOD FOR ENHANCED MESSAGING USING EXTERNAL IDENTIFIERS

BACKGROUND

Machine-type communication (MTC) allows systems to communicate with other devices without manual human interaction. MTC may include a wide range of applications for interaction between devices, such as Internet of Things (IoT) technology, monitoring and control for industrial automation, logistics, Smart Grid, Smart Cities, health, defense, etc. The data transferred during MTCs may include different types and sizes that may be associated with different applications. For example, MTC may include short messages, multimedia messages, etc.

Machine-type communications may be transmitted over high-speed data transmission networks, such as a Third Generation Partnership Project (3GPP) network. 3GPP provides system specifications that cover telecommunications network technologies, including radio access, the core transport network, and service capabilities (e.g., work on codecs, security, quality of service, etc.). 3GPP specifications also cover non-radio access to the core network, and interworking with Wi-Fi networks.

Since MTC technology has nearly limitless applications that can be leveraged to form new and useful services, interest among service providers and developers in MTC technology continues to increase. Supporting the growing number of connected devices, including those using MTC technology, presents a significant challenge for providers of network services.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

It is anticipated that the standard 15 digit number structure of the international public telecommunication numbering plan (International Telegraph Union Telecommunication Standardization Sector (ITU-T) recommendation E.164) will not be sufficient to support the vast number of MTC devices in the near future. Furthermore, for some IoT applications, a mobile directory number (MDN) as a subscriber identity is not needed. To address the growing number of MTC devices, some standards (e.g., 3GPP, section 19.7.2 of TS 23.003) have adopted an External Identifier (e.g., "<Local Identifier>@<Domain Identifier>" format) as an additional identifier for MTC devices to facilitate MTC device communication. Under the standards, user equipment (UE) with one International Mobile Subscriber Identity (IMSI) may have one or several globally unique External Identifiers. The External Identifiers may be stored in associated "user subscription" data within a Home Subscriber Server (HSS) of the user's home network. Each External identifier can be used to identify one of multiple MTC devices associated with the UE. However, use of External Identifiers is not restricted to MTC applications.

Currently, standards, such as 3GPP for example, do not support use of the External Identifier for the Sh interface between an HSS and an application server (AS). In many cases, the Sh interface is a versatile interface applicable to various purposes within a wireless network. For example, a Policy Charging Rules Function (PCRF) may want to store an MTC device's charging related data in an HSS. As another example, a voice control server for an MTC device may want to store an MTC UE's voice communication rule in the HSS. Without enhancement for the Sh interface to support External Identifiers, the usage of the External Identifier is limited in the wireless network, especially in terms of future support for an increasing variety of applications for MTC devices. For example, without an Sh interface supporting an External Identifier, if an AS only knows a UE's External Identifier (which may likely be the case for many future applications), the AS will not be able to retrieve a UE's HSS data for further processing to fulfill the objective of an application. An AS may want to send a short message service (SMS) message to the UE, while the network only handles SMS messages based on a user's private identifier (e.g., an IMSI, mobile station international subscriber directory number (MSISDN), or a mobile directory number (MDN)). Without retrieving the UE's private identifier the AS will not, be able to send the SMS message to the UE. Thus, enhancement of the Sh interface to support External Identifiers is needed to continue to promote and enhance usage of new MTC services.

According to an implementation described herein, a network device may obtain an External Identifier for a user device. The External Identifier includes a "<Local Identifier>@<Domain Identifier>" format. The network device may generate a message, the message including a user identity field for the user device. The user identity field includes the External Identifier. The network device may send, to another network device in a different network, the message via an Sh interface.

Figure 1:
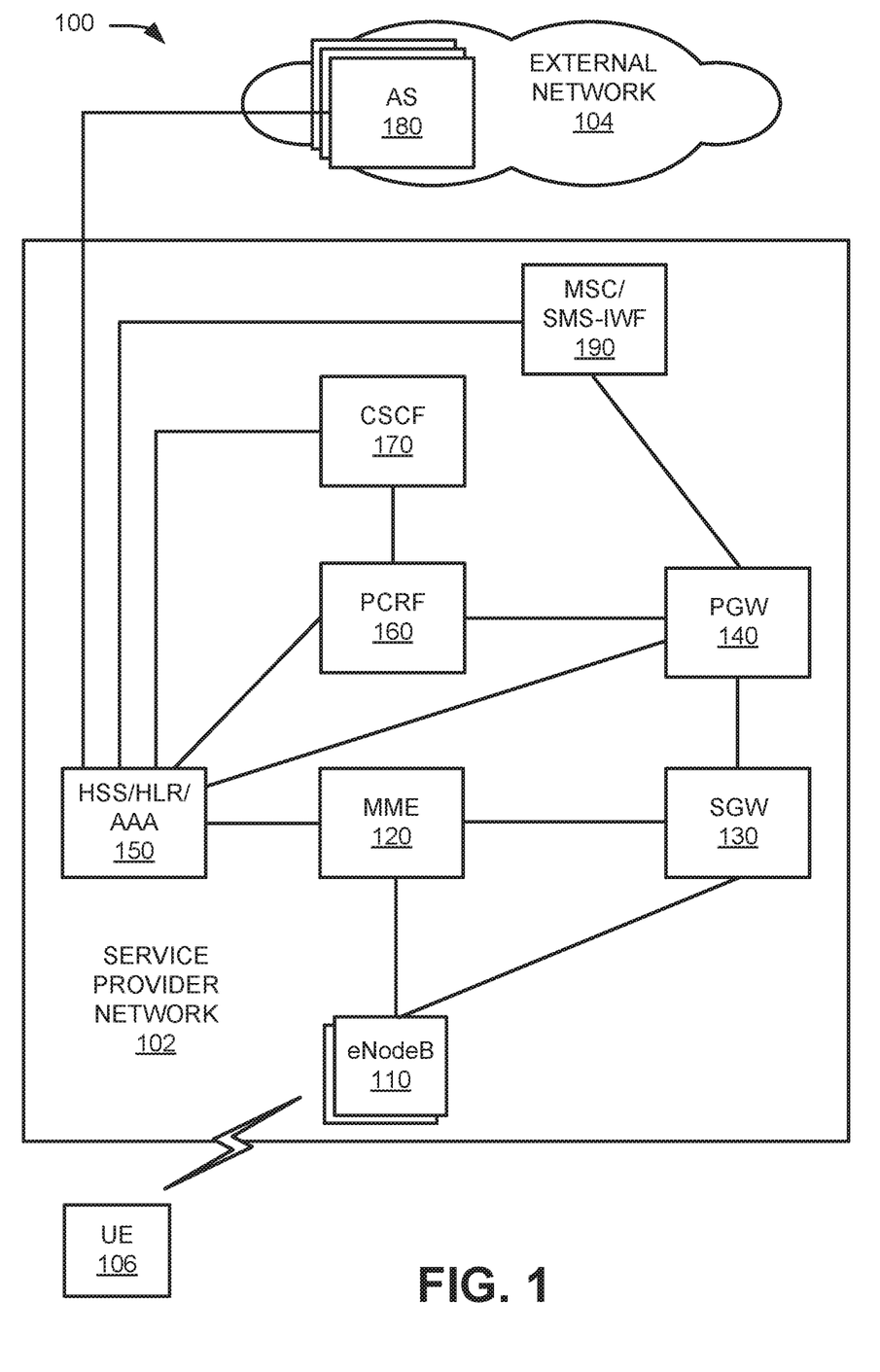
FIG. 1 is a block diagram of an exemplary network in which systems and methods described herein may be implemented.

FIG. 1 is a block diagram of an exemplary network 100 in which systems and methods described herein may be implemented. Network 100 may include a service provider network 102, an external network 104, and a UE device 106.

Service provider network 102 may include one or multiple networks of one or multiple types. For example, service provider network 102 may be implemented to include a terrestrial network, a satellite network, a wireless network, and/or a wired network. According to an exemplary implementation, service provider network 102 includes a radio access network (RAN). The RAN may be a Third Generation (3G) RAN, a Fourth Generation (4G) RAN, a 5G RAN, a future generation wireless network architecture, etc. By way of further example, access network 105 may include an Evolved UMTS Terrestrial Radio Access Network (E-UTRAN) of a Long Term Evolution (LTE) network or LTE-Advanced (LTE-A) network, a U-TRAN, Universal Mobile Telecommunications System (UMTS) RAN, a Global System for Mobile Communications (GSM) RAN, or the like. Service provider network 102 may provide access to external network 104 for wireless devices, such as LIE device 106. Service provider network 102 may provide mobile telephone service and/or data services to UE device 106. For example, service provider network 102 may establish a packet data network connection (e.g., an Internet Protocol (IP) connection) between UE device 106 and external network 104. In some implementations, service provider network 102 may include a core transport network, such as a LTE access network (e.g., an evolved packet core (EPC) network) based on the LTE standard specified by the 3GPP.

Service provider network 102 may include one or more eNodeBs 110, mobility management entity (MME) devices 120, serving gateways (SGW) 130, packet data network (PDN) gateways (PGW) 140, home subscriber server (HSS)/home location register (HLR)/Authentication, Authorization, and Accounting (AAA) devices 150, policy and charging rules function (PCRF) devices 160, a call session control function (CSCF) 170, and a mobile switching center (MSC)/SMS-Interworking Function (SMS-IWF) 190. While service provider network 102 is shown in the context of a Long Term Evolution (LIE) network, it should be appreciated that embodiments presented herein may operate in any appropriate wireless network(s), such for example, Internet Protocol Multimedia Subsystem (IMS) networks, 3G networks, LTE/4G networks, or 5G networks.

External network 104 includes one or multiple networks of one or multiple types. For example, external network 104 may be implemented as an IMS network, a service or application-layer network, an IP network, the Internet, a proprietary network, a cloud network, a data network, etc. External network 104 may include application servers (AS) 180, among other devices (not shown).

UE device 106 (also referred to herein as a "user device") may include a handheld wireless communication device (e.g., a smart phone, etc.); a wearable computer device; a global positioning system (GPS) device; a laptop or tablet computer; a portable gaming system; a home appliance device; a home monitoring device; an MTC device; and/or any other type of computer device with wireless communication capabilities. In other implementations, UE device 106 may correspond to an embedded wireless device that communicates wirelessly with other devices over a machine-to-machine (M2M) interface using MTC and/or another type of M2M communication.

eNodeB 110 may use the Evolved Universal Terrestrial Radio Access (E-UTRA) air interface to wirelessly communicate with devices, such as UE device 106. eNodeB 110 may include one or more devices (e.g., base stations) and other components and functionality that allow UE device 106 to wirelessly connect to service provider network 102.

MME device 120 (also referred to herein simply as "MME 120") may implement control plane processing for service provider network 102. For example, MME 120 may implement tracking and paging procedures for UE device 106, may activate and deactivate bearers for UE device 106, may authenticate a user of UE device 106, and may interface to non-LTE radio access networks.

SGW 130 may provide an access point to and from UE device 106, may handle forwarding of data packets for UE device 106, and may act as a local anchor point during handover procedures between eNodeBs 110.

PGW 140 may function as a gateway to external network 104. A particular UE device 106, while connected to a single SGW 130, may be connected to multiple PGWs 140—one for each packet network with which UE device 106 communicates. PGW 114 may enforce policies from PCRF 116, such as uplink and downlink data speeds, for individual sessions by UE device 106.

HSS/HLR/AAA device 150 (also referred to herein simply as "HSS 150") may store information associated with UE devices 106 and/or information associated with users of UE devices 106. For example, HSS device 120 may stor user profiles, such as a Subscriber Profile Repository (SPR), that include authentication and access authorization information. The subscriber profile may also identify particular services, to which the user has subscribed, that are to be provided when an online charging action is to be performed. In one implementation, HSS 150 may be implemented as an HLR, which includes a central database containing details of subscriber devices that are authorized to access a wireless network. In other implementations, the HSS may be implemented as a User Profile Server Function (UPSF). As an AAA function, HSS 150 may verify a subscriber's identity, authenticate and/or authorize UE device 106 using a device identification number (e.g., by performing IMSI or MAC authentication), authorize a particular service, and/or track consumption of network resources for a user.

PCRF device 160 (also referred to herein simply as "PCRF 160") provides policy control decision and flow-based charging control functionalities. PCRF 160 may include a network device, server device, or a distributed component. PCRF 160 may provide network control regarding service data flow detection, gating, quality of service (QoS) and flow-based charging, etc. PCRF 160 may determine how a certain service data flow shall be treated, and may ensure that traffic mapping and treatment is in accordance with a user's subscription profile.

CSCF 170 may handle signaling, controlling of media paths, and activation of applications in external network 104. CSCF may include one or more Proxy Call Session Control Functions (P-CSCF), serving Call Session Control Functions (S-CSCF), and Interrogating Call Session Control Functions (I-CSCF).

AS 180 may implement particular services and interact directly or indirectly with devices in service provider network 102 (e.g., HSS 150, CSCF 170, etc.) to deliver the particular applications and/or services to UE device 106. For example, AS 180 may be implemented to provide an M2M application or service, or other type of application and/or service (e.g., an end user application, an end user service, etc.).

MSC/SMS-IWF 190 may be responsible for managing communications between the UE device 106 and the other elements of external network 104. As an MSC, MSC/SMS-IWF 190 may handle voice calls and messaging service message requests as well as other services (such as conference calls, FAX and circuit switched data, messaging service communications, Internet access, etc.). As an SMS-IWF, MSC/SMS-IWF 190 may function as an interface device between AS 180 and service provider network 102. For example, MSC/MTC-IWF 190 may implement a control plane interface with elements of service provider network 102 and may generate a request message such as a request to authenticate UE device 106 and/or a request to wake up UE device 106—to a particular element of service provider network 102 based on a request received from AS 180. MSC/MTC-IWF 190 may receive an indication from service provider network 102 that UE device 106 has woken up and is ready for communicating with AS 180 and may inform AS 180 that UE device 106 has woken up and is ready for communication.

It is noted that FIG. 1 depicts a representative network 100 with exemplary components and configuration shown for purposes of explanation. Other embodiments may include additional or different network entities in alternative configurations than those which are shown in FIG. 1. For example, one or more components of network 100 may perform multiple functions, including those described as being performed by one or more other components. Additionally, or alternatively, one or more network devices indicted as part of one network (e.g., service provider network 102) could be included in a different network (e.g., external network 104).

Figure 2:
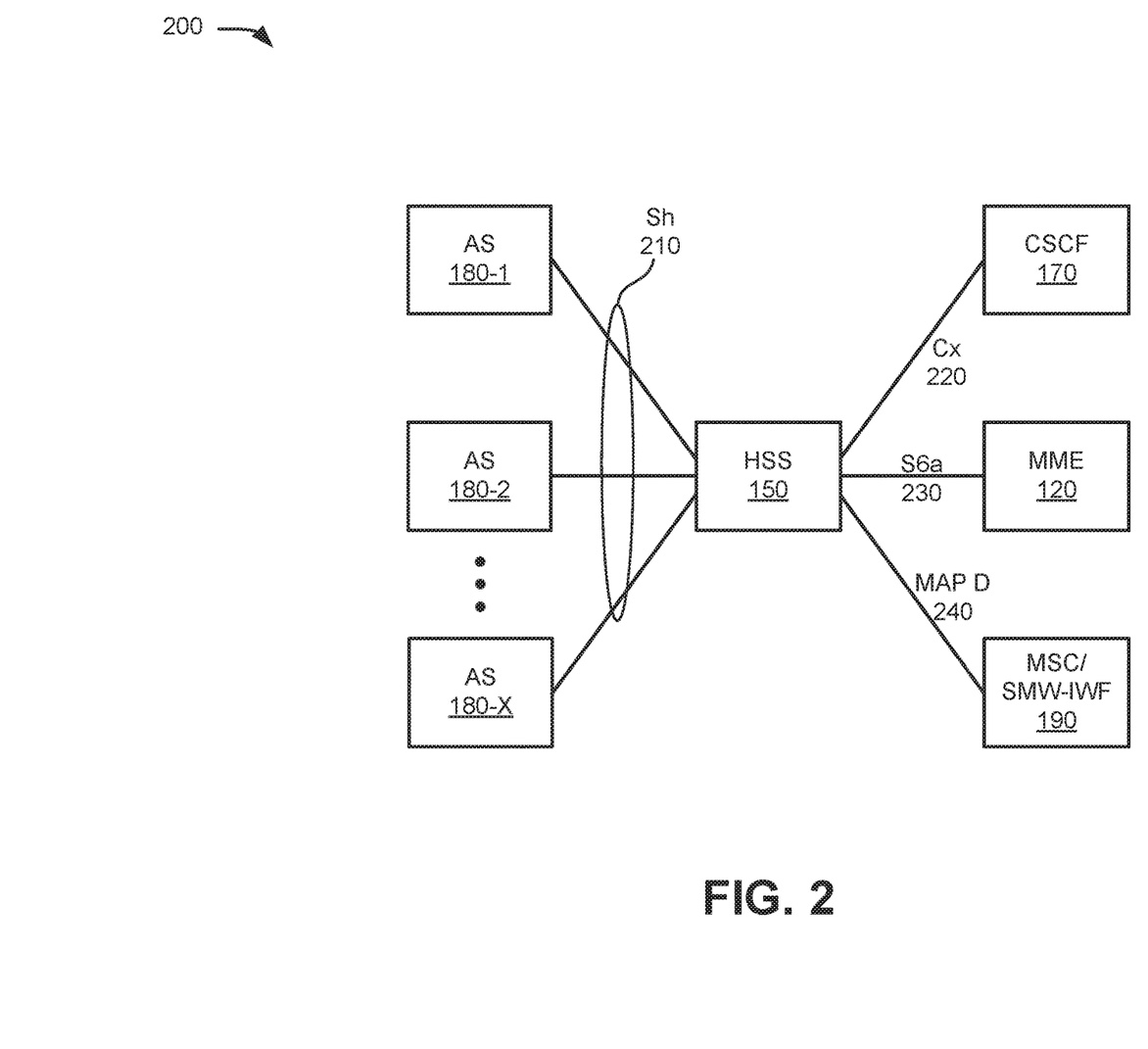
FIG. 2 is a block diagram showing exemplary communication interfaces in a portion of the network of FIG. 1.

FIG. 2 is a diagram illustrating an example of communication interfaces in a portion 200 of network 100. As shown in FIG. 2, network portion 200 may include MME 120, HSS 150, CSCF 170, AS 180-1 through 180-X (referred to herein generically as "AS 180"), and MSC/MTC-IWF 190.

As shown in FIG. 2, each AS 180 may communicate with HSS 150 through an Sh interface 210. CSCF 170 may communicate with HSS 150 through a Cx interface 220. MME 120 may communicate with HSS 150 through an S6a interface 230. Sh interface 210, Cx interface 220, and Sha interface 230 may be implemented, for example, using the Diameter protocol.

MSC/MTC-IWF 190 may communicate with HSS 150 through a Mobile Application Part (MAP) D interface 240. MAP interface 240 may be implemented, for example, using the Signaling System No. 7 (SS7) protocol.

According to implementations described herein, Sh interface 210 provides an enhancement (i.e., over the prior standard Sh interface) to support an External Identifier. More particularly, a UE's (e.g., UE device 106) External Identifier will be allowed to be used over Sh interface 210 as a query identifier to enable querying of UE device's 106 data stored at HSS 150, such as, for example: the UE's all identities data (IMSI, MSISDN, IMS private identity, IMS public identities, implicit identities, and registered identities), the UE's application repository data, the UE's circuit-switched (CS) location data, the UE's packet-switched (PS) location data, the UE's evolved packet system (EPS) location data, UE's CS user state, UE's PS user state, UE's EPS user state, UE's CSCF name, UE's charging info, UE's IMS initial filter criteria (IFC) data, etc.

Sh interface 210 also allows AS 180 to receive the UE's IMSI or private ID based on the UE's External Identifier. Such an exchange is important because some network elements in a wireless network only support using IMSI to identify a UE device. For example, an SMS Center (SMSC) may only support using IMSI network signaling communication. With the Sh enhancement described herein, a network element or application server that has only an External Identifier of UE device 106, may use Sh interface 210 to retrieve (e.g., from HSS 150) an IMSI, a private ID, and other subscriber information for UE device 106.

Although FIG. 2 shows exemplary components of network portion 200, in other implementations, network portion 200 may include fewer components, different components, additional components, or differently arranged components than depicted in FIG. 2.

Figure 3:
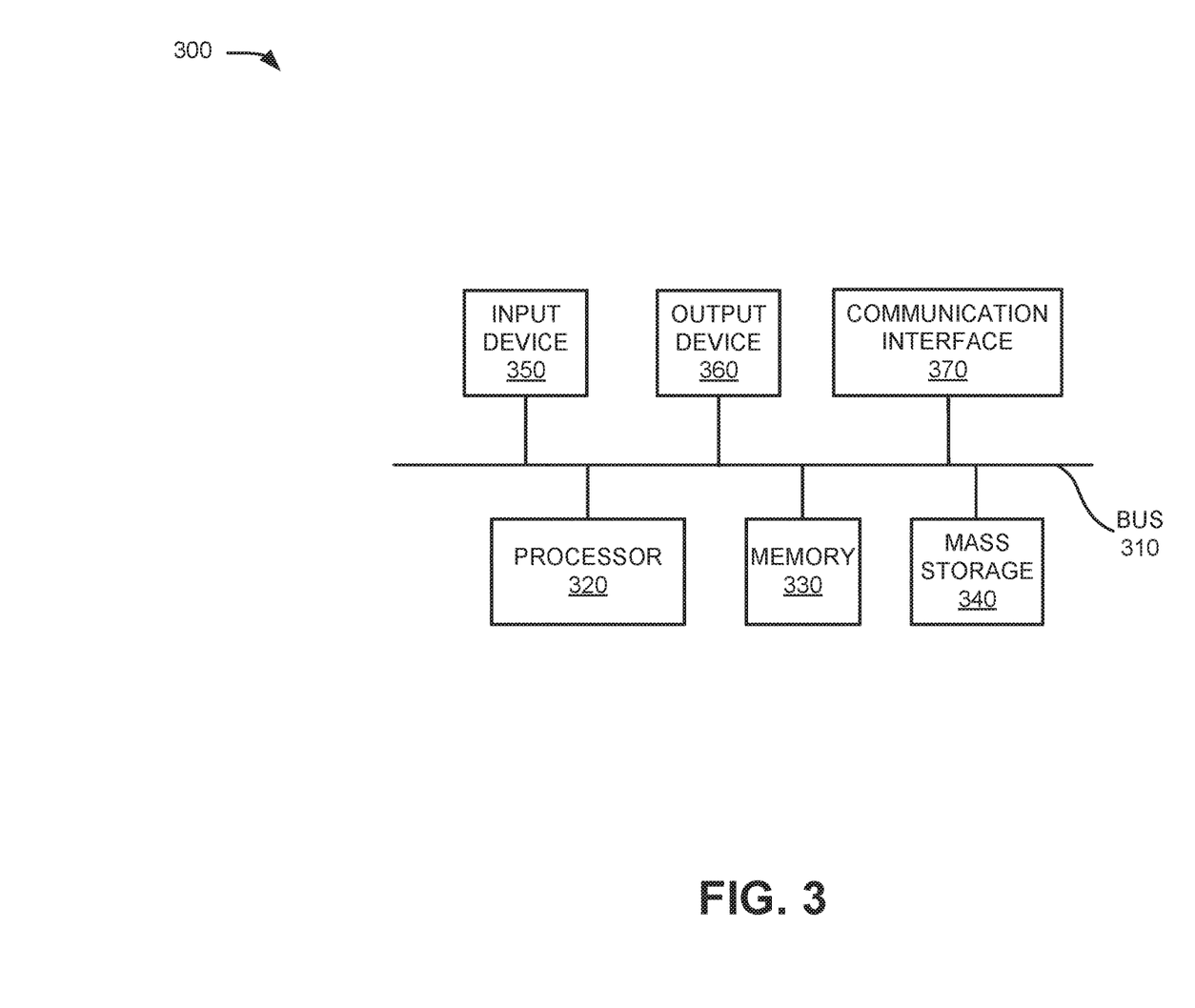
FIG. 3 is a block diagram illustrating components of a network device of FIG. 1.

FIG. 3 is a block diagram showing exemplary components of a network element 300, according to an embodiment. One or more of eNodeB 110, MME 120, SGW 130, PGW 140, HSS/HLR/AAA 150, PCRF 160, CSCF 170, AS 180, MSC/SMS-IWF 190 may be implemented as a network element 300. Network element 300 may include a bus 310, a processor 320, a memory 330, mass storage 340, an input device 350, an output device 360, and a communication interface 370.

Bus 310 includes a path that permits communication among the components of network element 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic. For example, processor 320 may be an x86 based CPU, and may use any operating system, which may include varieties of the Windows, UNIX and/or Linux. Processor 320 may also use high-level analysis software packages and/or custom software written in any programming and/or scripting languages for interacting with other network entities that are communicatively coupled to network 100.

Memory 330 may include any type of dynamic storage device that may store information and/or instructions, for execution by processor 320, and/or any type of non-volatile storage device that may store information for use by processor 320. For example, memory 330 may include a RAM or another type of dynamic storage device, a ROM device or another type of static storage device, and/or a removable form of memory, such as a flash memory. Mass storage device 340 may include any type of on-board device suitable for storing large amounts of data, and may include one or more hard drives, solid state drives, and/or various types of arrays.

Input device 350, which may be optional, can allow an operator to input information into network element 300, if required. Input device 350 may include, for example, a keyboard, a mouse, a pen, a microphone, a remote control, an audio capture device, an image and/or video capture device, a touch-screen display, and/or another type of input device. In some embodiments, network element 300 may be managed remotely and may not include input device 350. Output device 360 may output information to an operator of network element 300. Output device 360 may include a display, a printer, a speaker, and/or another type of output device. In some embodiments, network element 300 may be managed remotely and may not include output device 360.

Communication interface 370 may include a transceiver that enables network element 300 to communicate within network 100 with other devices and/or systems. The communication interface 370 may be configured for wireless communications radio-frequency, infrared, and/or visual optics, etc.), wired communications conductive wire, twisted pair cable, coaxial cable, transmission line, fiber optic cable, and/or waveguide, etc.), or a combination of wireless and wired communications. Communication interface 370 may include a transmitter that converts baseband signals to RF signals and/or a receiver that converts RF signals to baseband signals.

As described below, network element 300 may perform certain operations relating to server and/or gateway operations. Network element 300 may perform these operations in response to processor 320 executing software instructions contained in a computer-readable medium, such as memory 330 and/or mass storage 340. A computer-readable medium may be defined as a non-transitory memory device. A non-transitory memory device may include memory space within a single physical memory device or spread across multiple physical memory devices. The software instructions may be read into memory 330 from another computer-readable medium or from another device. The software instructions contained in memory 330 may cause processor 320 to perform processes described herein, such as, for example, process 600 depicted in FIG. 6. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of network element 300, in other implementations, network element 300 may include fewer components, different components, additional components, or differently arranged components than depicted in FIG. 3.

Figure 4:
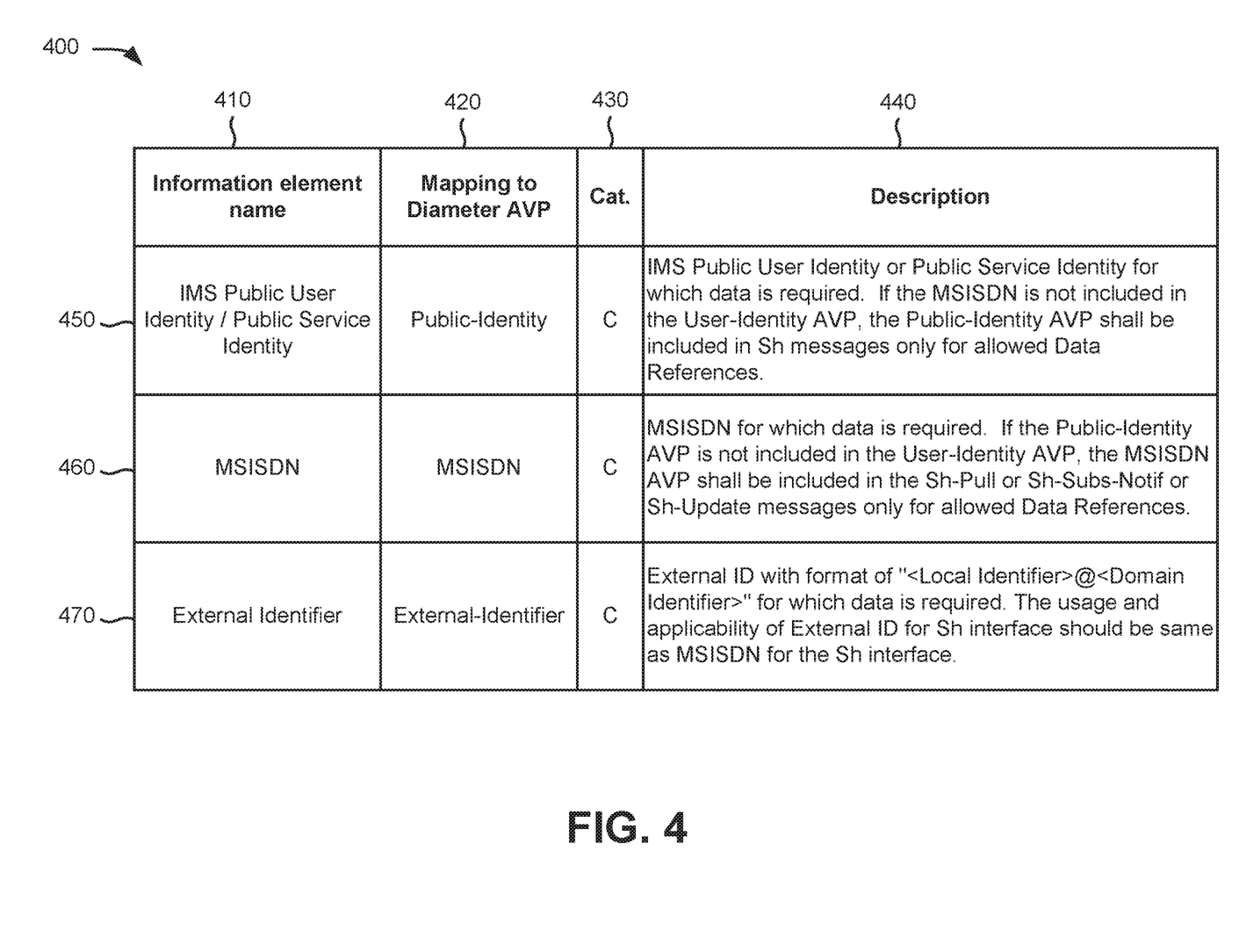
FIG. 4 is a diagram illustrating an example of a table including user identities available when using the Sh interface, according to an implementation described herein.

As noted above, current specifications for the Sh interface, such as for example, the current 3GPP specification, support information elements for IMS Public User Identity/Public Service Identity and MSISDN. FIG. 4 shows an example of a table 400 including user identities available when using the Sh interface according to an implementation described herein. Table 400 may correspond, for example, to how a table could be modified to include an additional information element (IE) for the External Identifier. As shown in FIG. 4, table 400 may include an information element name field 410, a mapping to diameter attribute value pair (AVP) field 420, a category field 430, and a description field 440. Entries 450 and 460 may correspond to information elements supported in the Sh interface. Particularly entry 450 may correspond to IMS Public User Identity/Public Service Identity and entry 460 may correspond to MSISDN.

Entry 470 may identify features of a new information element for an External Identifier. Thus, the name in information element name field 410 for entry 470 may be "External identifier." The mapping to diameter AVP field 420 for entry 470 may be "External identifier" and may refer to another technical specification and section for HSS diameter interfaces that use the External Identifier. The category in category field 430 may be "C" (conditional), and the description field 440 may include a description of the External Identifier format (e.g., "<Local Identifier>@<Domain Identifier>") and usage and applicability guidelines (e.g., the same usage and applicability as the MSISDN for the Sh interface).

In addition to changes to user identities, such as shown in table 400, the enhancement of the Sh interface to support External Identifiers may also impact other messaging formats and/or practices. Particularly, External Identifiers may be added to the class of Public Identifiers available for use in the Sh interface (e.g., in addition to the classes IMSPublicIdentity or MSISDN). Additionally, message formats that include descriptions related to the Public User Identity may be updated, for example, as "Public User Identity or External ID." As another example, the User-Identity AVP in Sh interface messages may be updated to include reference to the External Identifier (e.g., in addition to Public Identity and MSISDN). Furthermore, the Sh interface may also be added to an interface list that supports the External Identifier.

These updates may be configured on various network devices, including HSS 150, AS 180, etc.

Thus, according to implementations described herein, when a network element, such as AS 180, has only a UE's External identifier and would like to retrieve the UE's Sh-IMS-data (e.g., as indicated in section C.3 of TS 29.328), the network element ill be allowed to use the UE's External Identifier to query HSS 150. Additionally, when a network element has only UE's External Identifier and would like to retrieve UE's other IDs (e.g., including the UE's MSISDN, IMSI, other External identifiers, IMS private ID, and IMS public IDs), the network element will be allowed to use the UE's External Identifier to query HSS 150.

With the enhancement of the Sh interface to support External Identifiers, any Sh message that uses the User Identity AVP as a query key may be able to use an External Identifier to query the HSS data. For example, any of User Data Request (UDR), Profile Update Request (PUR), Subscribe Notifications Request (SNR), or Push Notification Request (PNR) over the Sh interface may use the External Identifier in the User Identity AVP of these requests.

Figure 5:
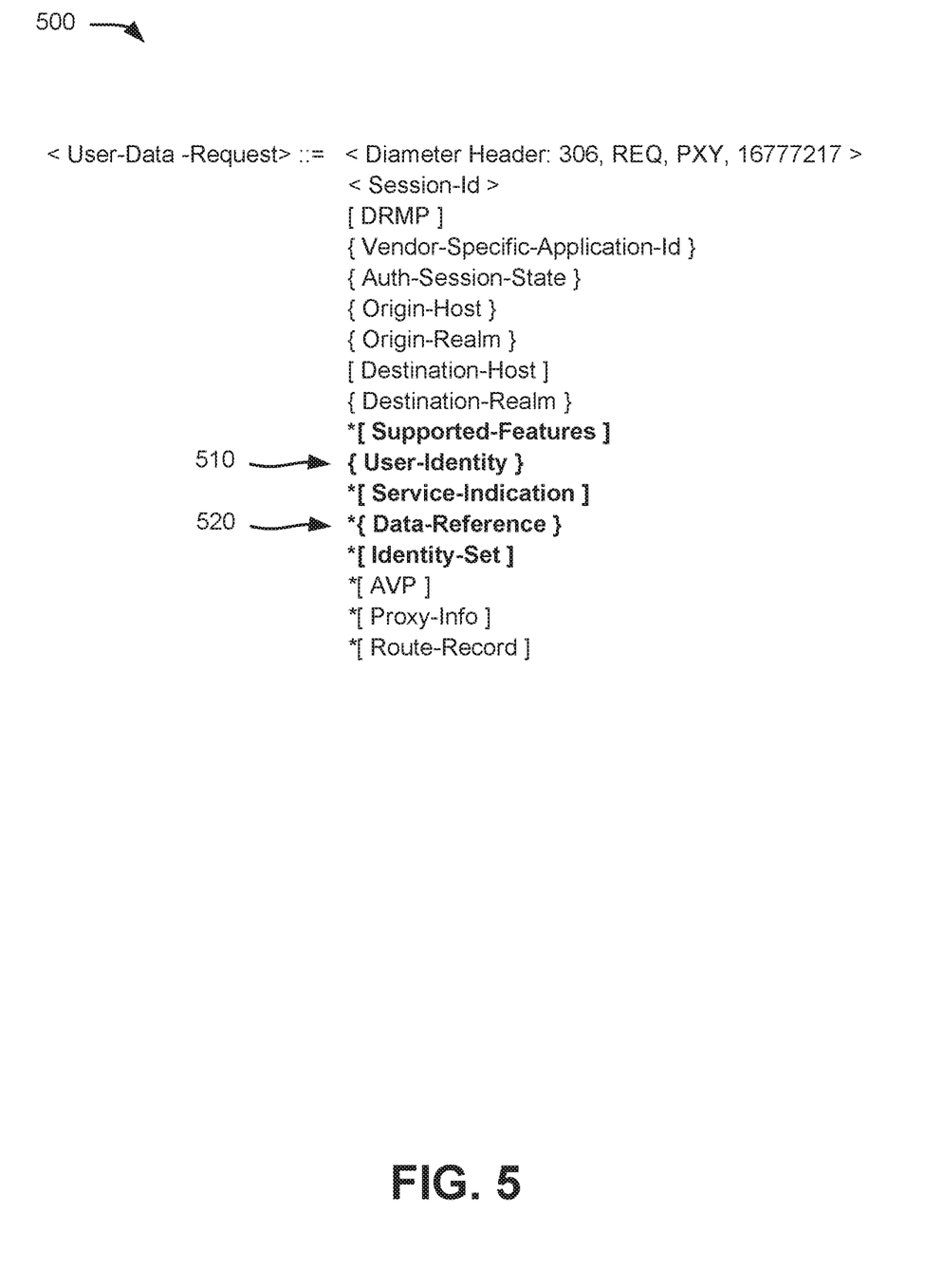
FIG. 5 is a diagram illustrating an example of a user data request (UDR) format, according to an implementation described herein.

FIG. 5 includes an example of a UDR format 500, according to an implementation described herein. When the User Identity AVP field 510 contains an External Identifier (not illustrated) and the Data Reference AVP field 520 indicates "0 (repository data)" (not illustrated) in an Sh UDR message, the application server (e.g., AS 180) will be able to use the Sh UDR message to query the user's application-specific repository data based on the user's External Identifier. Similarly, by supporting use of the External Identifier in the User Identity AVP, the PUR and SNR Sh messages initiated by AS 180 can support requests to read user's HSS data or updating user's application repository data based on the user's External Identifier. Additionally, a PNR from HSS 150 to AS 180 with an External Identifier may be received and AS 180 may provide a push notification answer (PNA) based on the External Identifier in the PNR.

Figure 6:
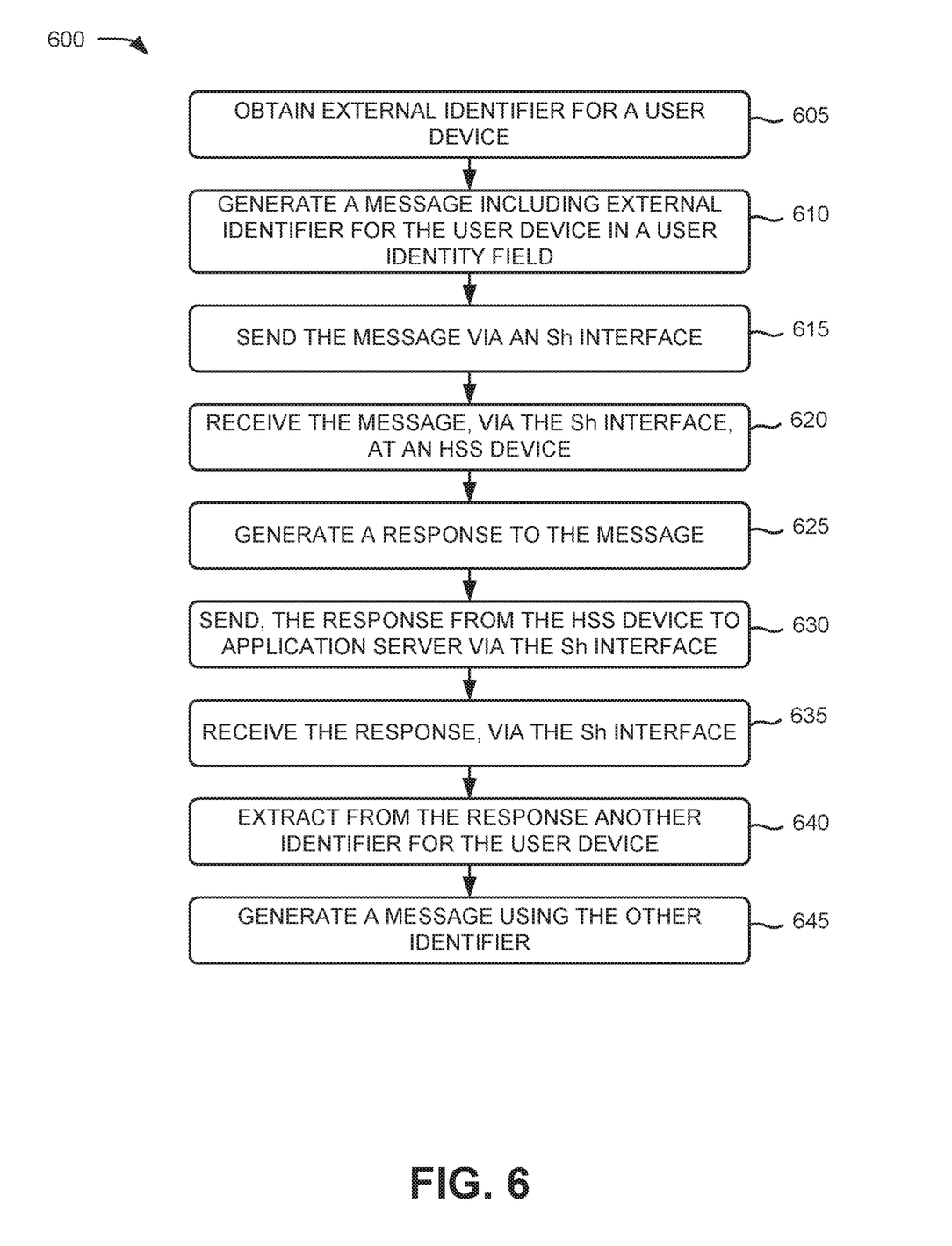
FIG. 6 is a flow chart showing an exemplary process for using an External Identifier over an Sh interface, according to an implementation described herein.

FIG. 6 provides a flow chart showing an exemplary process 600 for implementing an External identifier over an Sh interface, one implementation, process 600 may be performed by a network device, such as AS 180. In another implementation, process 600 may be performed by AS 180 in conjunction with one or more other devices, such as HSS 150.

Process 600 may include obtaining an External Identifier for a user device (block 605). For example, UE device 106 may send a service request to AS 180. The service request may provide an External Identifier as the only unique identifier for UE device 106. The service request may require AS 180 to request information from another network device (e.g., a network device in service provider network 102, such as MME 120, or a network device in another portion of external network 104) over an interface that does not support use of External Identifiers.

Process 600 may also include generating a message including the External Identifier for the user device in a user identity field (block 610) and sending the message via an Sh interface (block 615). For example, in response to receiving the service request from UE device 106, AS 180 may generate a message, such as a read command (e.g., a UDR), an update command (e.g., a PUR), or a subscribe command (e.g., an SNR). The message may include the External Identifier for UE device 106. In one implementation, the External identifier may be included in a user identity AVP of the message. AS 180 may send the message to HSS device 150 via a Diameter Sh interface.

Process 600 may further include receiving the message, via the Sh interface, at an HSS device (block 620); generating a response to the message (block 625); and sending, the response from the HSS device to the AS via the Sh interface (block 630). For example, HSS 150 may receive the message from AS 180 via the Sh interface. HSS 150 may generate a response, such as a read answer (e.g., a User Data Answer (UDA)), an update answer (e.g., a Profile Update Answer (PUA)), or a notification answer (e.g., a Subscribe Notifications Answer (SNA)). In one implementation, the response may include an identifier (e.g., an IMSI, an MSISDN, an MDN, etc.) for UE device 106 that corresponds or maps to the External Identifier. HSS device 150 may send the response to AS 180 via a Diameter Sh interface.

Process 600 may additionally include receiving the response via the Sh interface (block 635); extracting from the response another identifier for the user device (block 640); and generating a request using the other identifier (block 645). For example, AS 180 may receive a UDA or SNA and extract an IMSI, MSISDN, or a MDN for the user device that corresponds or maps to the External Identifier. AS 180 may use the IMSI, MSISDN, or MDN to generate and transmit a query, for example, over another interface that uses the IMSI, MSISDN, MDN, or other type of identifier, but does not support the External Identifier.

Figure 7:
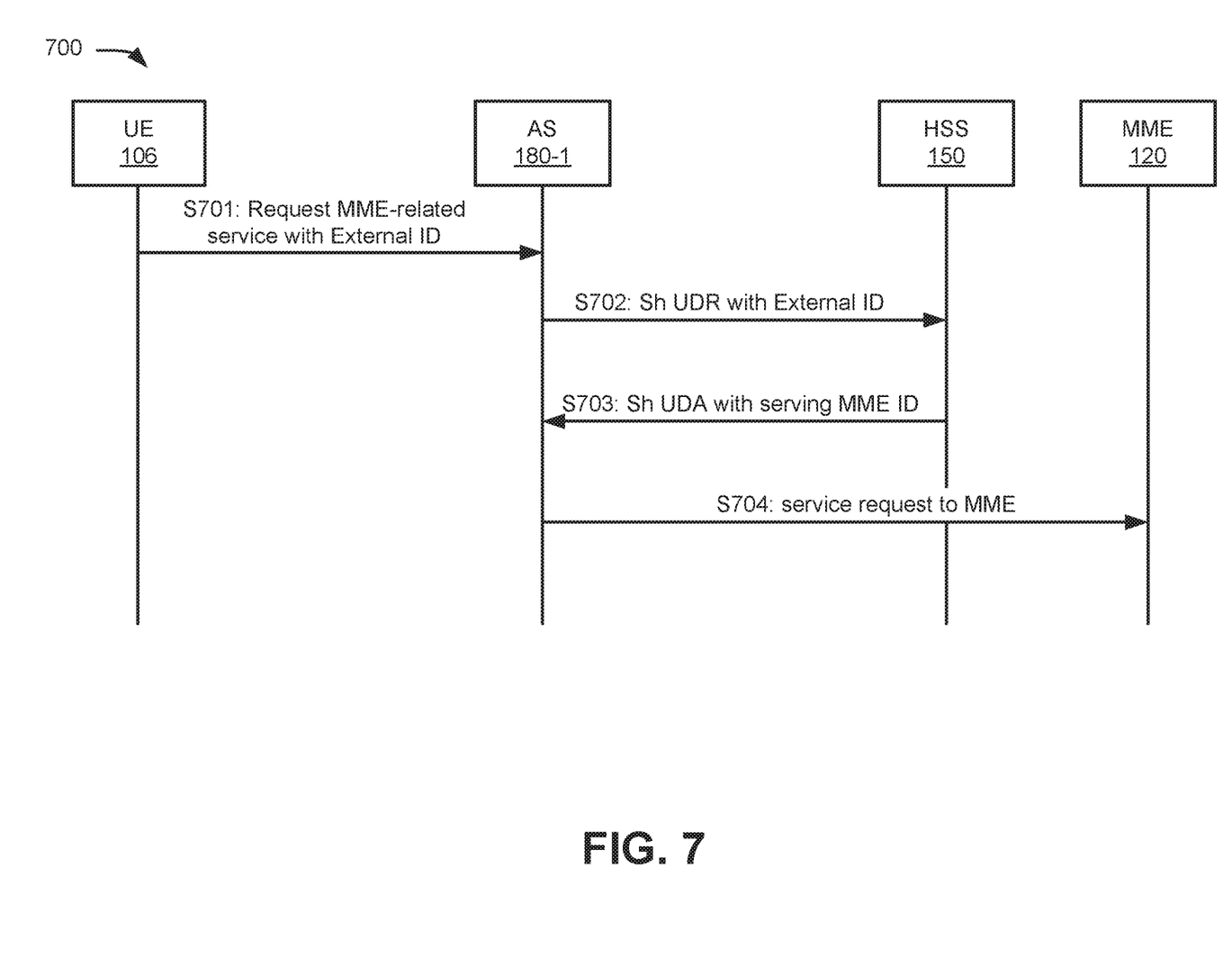
FIG. 7 is a diagram illustrating exemplary communication flows for implementing an External Identifier over an Sh interface for a use case, according to an implementation described herein.

FIG. 7 illustrates communications for a use case for implementing an External Identifier over an Sh interface in a portion 700 of network 100. More particularly, the communications of FIG. 7 represent an application server querying an HSS for a UE's serving MME identifier using the UE's External Identifier. As shown in FIG. 7, at step S701, UE device 106 may send a request to AS 180-1 for an MME-related service. The request may include an External Identifier of UE device 106, but not another UE identifier (such as an IMSI or MDN). At step S702, AS 180-1 may send a UDR to HSS 150 using an Sh interface (e.g., Sh interface 210). The UDR may include the External Identifier for UE device 106 and may request the name of the serving MME (e.g., MME 120) for UE device 106.

HSS 150 may receive the UDR and, at step S703, may provide a UDA to HSS 150 via the Sh interface (e.g., Sh interface 210). The UDA may include the serving MME's identifier for UE device 106. AS 180-1 may receive the UDA and may use the MME identifier, at step S704, to submit a service request to MME 120 via an S6a interface (e.g., S6a interface 230) in accordance with the original request (of step S701) from UE device 106.

Figure 8:
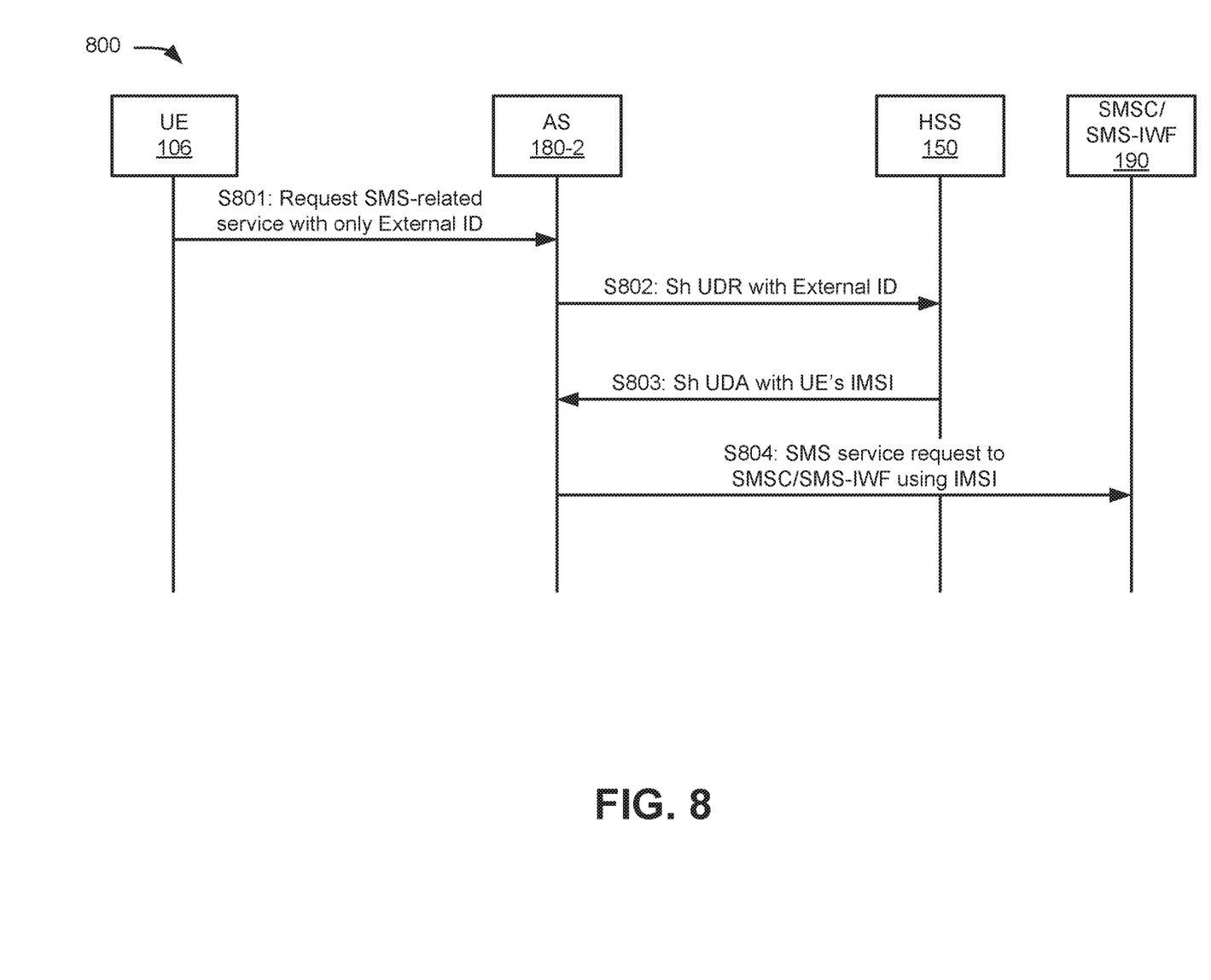
FIG. 8 is a diagram illustrating exemplary communication flows for implementing an External Identifier over an Sh interface for another use case, according to another implementation described herein.

FIG. 8 illustrates communications for another use case for implementing an External Identifier over an Sh interface in a portion 800 of network 100. More particularly, the communications of FIG. 8 represent an application server querying an HSS for a UE's IMSI for an SMS related service. As shown in FIG. 8, at step S801, UE device 106 may send a request to AS 180-2 for an SMS-related service that requires an IMSI for UE device 106. The request may include an External Identifier for UE device 106, but not the IMSI (or another UE identifier). At step S802, AS 180-2 may send a UDR to HSS 150 using an Sh interface (e.g., Sh interface 210). The UDR may include the External Identifier for UE device 106 and may request the IMSI for UE device 106.

HSS 150 may receive the UDR and, at step S803, may provide a UDA to HSS 150 via the Sh interface (e.g., Sh interface 210). The UDA may include the IMSI for LIE device 106. AS 180-2 may receive the UDA and may use the IMSI, at step S804, to submit a service request to MSC/SMS-IWF 190 via a MAP interface (e.g., MAP D interface 240) in accordance with the original request (of step S801) from UE device 106. In one implementation, AS 180-2 may temporarily store the IMSI (or another unique identifier corresponding to the External Identifier) for use in subsequent requests from UE device 106. For example, AS 180-2 may store the IMSI during a current session with UE device 106 and subsequently purge the IMSI data when the session is ended.

The foregoing description of implementations provides illustration and description, but is not intended to be exhaustive or to limit the invention to the precise form disclosed. Modifications and variations are possible in light of the above teachings or may be acquired from practice of the invention. Also, while series of blocks have been described with regard to FIG. 6 and signal flows with respect to FIGS. 7 and 8, the order of the blocks and/or signal flows may be modified in other embodiments. Further, non-dependent blocks may be performed in parallel.

Certain features described above may be implemented as "logic," a "module," or a "unit" that performs one or more functions. This logic, module, or unit may include hardware, such as one or more processors, microprocessors, application specific integrated circuits, or field programmable gate arrays, software, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise. The term "exemplary," as used herein means "serving as an example." Any embodiment or implementation described as "exemplary" is not necessarily to be construed as preferred or advantageous over other embodiments or implementations.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and the type of information. Storage and use of personal information may be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by an application server device in an internet protocol (IP) network that is external to a core transport network, a service request from a user device, the service request including an External Identifier that uses a pre-defined format to uniquely identify the user device without including any of an International Mobile Subscriber Identity (IMSI), a mobile station international subscriber directory number (MSISDN), and a mobile directory number (MDN) that corresponds to the user device;

creating, by the application server device and in response to the service request, a message including a user identity field for the user device,
  wherein the user identity field includes the External Identifier without including any of the IMSI, the MSISDN, and the MDN that corresponds to the user device, and
  wherein the message requests one or more of the IMSI, the MSISDN, or the MDN of the user device;

sending, by the application server device, the message to a home subscriber server (HSS) device that is in the core transport network, wherein the message is sent via an Sh interface using a Diameter protocol;

receiving, by the application server device and from the HSS device, a response to the message via the Sh interface, the response including one or more of the IMSI, the MSISDN, or the MDN that corresponds to the External Identifier of the user device; and generating, by the application server device and in response to the service request, a query, wherein the query uses one or more of the IMSI, the MSISDN, or the MDN that corresponds to the External Identifier.

2. The method of claim 1, further comprising:
extracting, by the application server device and from the response to the message via the Sh interface, one or more of the IMSI, the MSISDN, or the MDN that corresponds to the External Identifier.

3. The method of claim 1, wherein the core transport network includes an evolved packet core (EPC) network.

4. The method of claim 1, further comprising:
receiving, by the application server device, a Push Notification Request (PNR), the request including another user identity field for the user device, wherein the other user identity field includes the External Identifier; and
sending, by the application server device, a Push Notification Answer (PNA).

5. The method of claim 1, wherein the receiving includes receiving the response from the HSS device via the Sh interface.

6. The method of claim 1, further comprising:
receiving, by the HSS device, the message via the Sh interface.

7. The method of claim 6, further comprising:
creating, by the HSS device, the response to the message; and
sending, by the HSS device and to the application server device, the response via the Sh interface.

8. The method of claim 1, wherein the query includes one of:
  a first request to a mobility management entity (MME) device via an S6a interface, or
  a second request to a mobile switching center (MSC)/SMS-Interworking Function (SMS-IWF) via a MAP interface.

9. The method of claim 1, wherein the user identity field is included within an attribute value pair (AVP) of the message.

10. The method of claim 1, wherein the message includes one of a user data request (UDR), a profile update request (PUR), or a subscribe notifications request (SNR).

11. An application server device, comprising:
an interface that communicates with a devices in a core transport network from an internet protocol (IP) network that is external to the core transport network;
a memory configured to store instructions; and
a processor, coupled to the interface and the memory, wherein the processor is configured to execute the instructions stored in the memory to:
  receive a service request from a user device, the service request including an External Identifier that uses a pre-defined format to uniquely identify the user device without including any of an International Mobile Subscriber Identity (IMSI), a mobile station international subscriber directory number (MSISDN), and a mobile directory number (MDN) that corresponds to the user device;
  create, in response to the service request, a message including a user identity field for the user device,
    wherein the user identity field includes the External Identifier without including any of the IMSI, the MSISDN, and the MDN that corresponds to the user device, and
    wherein the message requests one or more of the IMSI, the MSISDN, or the MDN of the user device;
  send, from within the IP network and to a home subscriber server (HSS) device in the core transport network, the message, wherein the message is sent via an Sh interface using a Diameter protocol,
  receive, from the HSS device and via the Sh interface, a response to the message, the response including one or more of the IMSI, the MSISDN, or the MDN that corresponds to the External Identifier of the user device, and
  generate, in response to the service request, a query, wherein the query uses one or more of the IMSI, the MSISDN, or the MDN that corresponds to the External Identifier.

12. The application server device of claim 11, wherein the processor is further configured to execute the instructions stored in the memory to:
receive, from the HSS device, a request, the request including another user identity field for the user device, wherein the other user identity field includes the External Identifier;
create a response to the request; and
send, to the HSS device, the response to the request.

13. The application server device of claim 12, wherein the request includes a Push Notification Request (PNR), and wherein the response to the request includes a Push Notification Answer (PNA).

14. The application server device of claim 11, wherein the processor is further configured to execute the instructions stored in the memory to:
extract, from the response to the message via the Sh interface, one or more of the IMSI, the MSISDN, or the MDN that corresponds to the External Identifier.

15. The application server device of claim 11, wherein the core transport network includes an evolved packet core (EPC) network.

16. The application server device of claim 11, wherein the user identity field is included within an attribute value pair (AVP) of the message.

17. A non-transitory computer-readable medium, storing instructions executable by one or more processors, the non-transitory computer-readable medium comprising one or more instructions to:

receive, by an application server, a service request from a user device, the service request including an External Identifier that uses a pre-defined format to uniquely identify the user device without including any of an International Mobile Subscriber Identity (IMSI), a mobile station international subscriber directory number (MSISDN), and a mobile directory number (MDN) that corresponds to the user device;

create, in response to the service request, a message including a user identity field for the user device,
  wherein the user identity field includes the External Identifier without including any of the IMSI, the MSISDN, and the MDN that corresponds to the user device, and
  wherein the message requests one or more of the IMSI, the MSISDN, or the MDN of the user device;

send, from within an IP network and to a home subscriber server (HSS) device in a core transport network, the message via an Sh interface using a Diameter protocol;

receive, from the HSS device, a response to the message, the response including one or more of the IMSI, the MSISDN, or the MDN that corresponds to the External Identifier of the user device, and generate, in response to the service request, a query, wherein the query uses one or more of the IMSI, the MSISDN, or the MDN that corresponds to the External Identifier.

18. The non-transitory computer-readable medium of claim 17, wherein the message includes one of a user data request (UDR), a profile update request (PUR), a subscribe notifications request (SNR), or a push notification request (PNR), and
  wherein the user identity field is included within an attribute value pair (AVP) for the message.

19. The non-transitory computer-readable medium of claim 18, further comprising one or more instructions to:
  receive the response to the message via the Sh interface, the response including data for the user device.

20. The non-transitory computer-readable medium of claim 17, further comprising one or more instructions to:
  receive, from the HSS device, a request via the Sh interface, the request including another user identity field for the user device, wherein the other user identity field includes the External Identifier;
  create a response to the request; and
  send, to the HSS device, the response to the request via the Sh interface.

* * * * *